Sept. 20, 1938.   J. M. F. BOUILLON   2,130,763
CLOSING DEVICE FOR VESSELS CONTAINING A MATTER
UNDER PRESSURE, ESPECIALLY FIRE EXTINGUISHERS
Filed Nov. 17, 1937
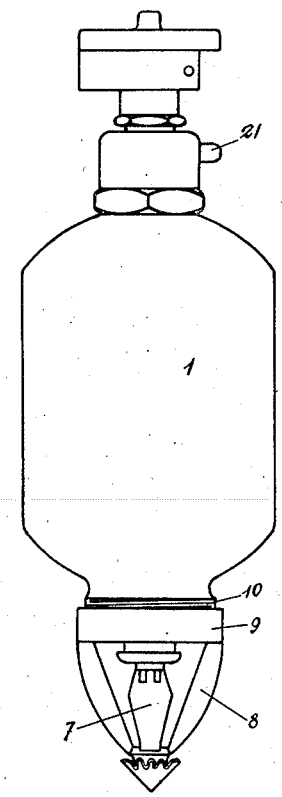
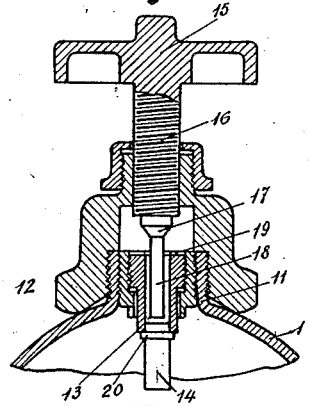
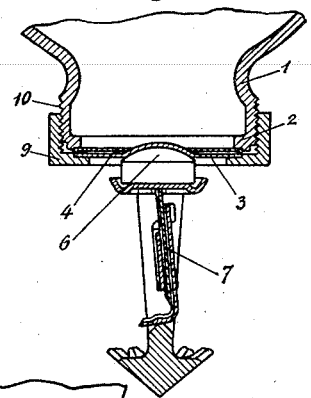
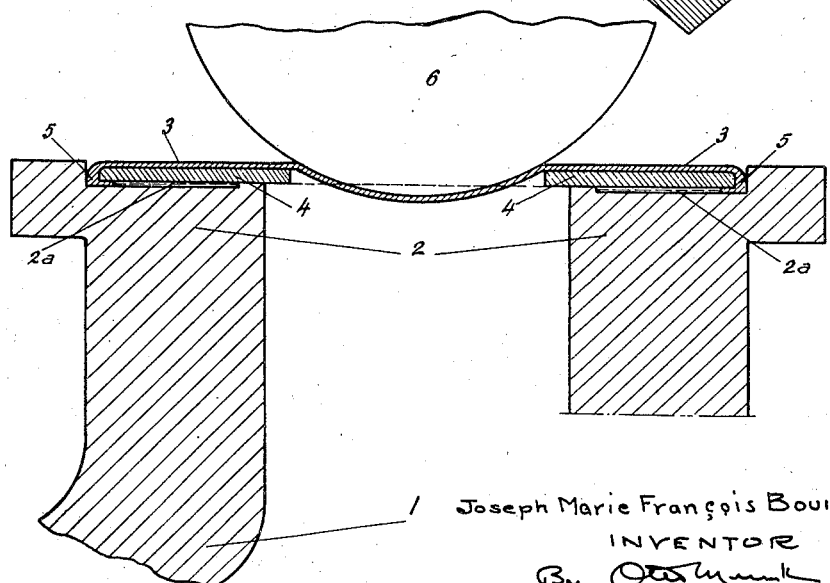
Joseph Marie François Bouillon
INVENTOR Patented Sept. 20, 1938

2,130,763

UNITED STATES PATENT OFFICE 2,130,763

CLOSING DEVICE FOR VESSELS CONTAINING A MATTER UNDER PRESSURE, ESPECIALLY FIRE EXTINGUISHERS

Joseph Marie Francois Bouillon, Paris, France

Application November 17, 1937, Serial No. 175,029
In France January 16, 1937

1 Claim. (Cl. 169—26)

The present invention relates to devices for closing a vessel containing a fluid under pressure in a fluidtight manner.

The invention is more especially, although not exclusively, concerned with closing devices to be used in connection with fire extinguishers, the latter containing chemical bodies which are to be kept, chiefly in view of their compression, perfectly fluidtight, especially for being handled before their utilization, whereas the release should take place in a reliable and efficient manner and always very rapidly.

The closing devices according to the present invention relate to the case in which opening is to take place automatically (under the effect of fusible or deformable elements) and to that in which it is to be manually controlled (for instance by means of a needle valve).

The chief object of the present invention is to provide closing devices of the kind above referred to which are better adapted to meet the requirements of practice than devices used for the same purpose prior to the present invention.

A first feature of the present invention, concerning automatically operated (temperature variation responsive) closing devices lies in the fact that fluidtightness is ensured by the provision of a thin sheet of a metal having a low mechanical resistance (lead, tin, electrolytic copper, etc.) soldered on the orifice to be closed.

According to another feature of the present invention, concerning the same kind of closing device, the above mentioned sheet of thin metal is welded by its periphery, along which it is associated with an annular piece of metal capable of absorbing the excess of heat of the soldering bath.

According to still another feature of the present invention, relating to the case of manually controlled closing devices, fluidtightness is ensured by a small metallic plug engaged partly in a nozzle carried by the vessel and normally welded to said nozzle, mechanical means being provided for driving said plug from said nozzle by breaking the soldered joint.

Other features of the present invention will result from the following detailed description of some specific embodiments thereof.

Preferred embodiments of the present invention will be hereinafter described, with reference to the accompanying drawing, given merely by way of example, and in which:

Fig. 1 is a diagrammatical elevational view of a fire extinguisher provided with automatic closing means and manually operative closing means according to the invention;

Fig. 2 is a sectional view of the automatic closing means, shown in a plane at right angles to the plane of projection of Fig. 1;

Fig. 3 is a detail view, on an enlarged scale, of the fluidtight joint included in the closing means of Fig. 2;

Fig. 4 is a sectional view of the fluidtight closing means for the manually controlled orifice provided on the same vessel.

Fig. 1 shows a fire extinguisher, the container of which forms the body 1 of the apparatus. In Fig. 1, said body is provided, at its upper part, with a manually controlled orifice, and at its lower part, with an automatically controlled orifice which is generally opened by fusing or deformation of elements, which destroys the fluidtight joint associated with said last mentioned orifice.

In order to obtain perfect fluidtightness, it has been found that the best and simplest solution consisted in soldering on the orifice a thin sheet or membrane of a metal having a low mechanical resistance such for instance as lead, tin, electrolytic copper and the like.

But it was very difficult to obtain a good soldering of a very thin sheet of a highly fusible metal. In actual practice, the sheet itself was partly fused during the soldering operation, and the industrial output of such a manufacture quickly proved to be extremely low.

According to a very interesting feature of the present invention, this drawback is obviated owing to a new arrangement of the sheet or membrane, which can now be quickly soldered, without experiencing any loss, so that it is possible to manufacture fluidtight closed fire extinguishers of the pressure type above referred to in an advantageous industrial manner.

The principle, according to the present invention consists in providing a flat annular member, of greater resistance, which insulates the thin membrane or sheet from the solder bath poured on the seat thereof, and over the outer edge of which the membrane or sheet is partly folded, so as to bring into contact with said bath an annular structure of reduced size but sufficiently strong for supporting the quick and efficient soldering thereof.

The container 1 of the fire extinguishing apparatus is provided, on the lower side, with an orifice for the projection of the extinguishing matter, and this orifice includes a seat 2 on which the fluidtight membrane or sheet 3 is to be soldered, said membrane or sheet consisting preferably of a soft metal easy to solder, such as lead, tin, electrolytic copper, etc.

When the container is to be stopped, as shown by Fig. 3, this orifice of container 1 is at the top, and a small bath of solder 2a is poured onto the seat 2a of said orifice.

The thin membrane or sheet 3 is applied against an annular part 4, also made, preferably, of a soft metal (in order to facilitate its jamming into position), but substantially thicker than membrane 3 and capable of easily supporting the contact of the solder bath. The membrane is a circular sheet of a diameter greater than the outer diameter of annular part 4, and the periphery of said sheet is folded down around the outer edge of the annular part, so as to form a portion 5 which is slightly stronger than the remainder of the sheet as a consequence of the accumulation of metal due to the radial creasing of the peripheral portion of said sheet 3.

The whole is then placed and applied on the seat 2 of the orifice, into contact with the solder bath. Thus portion 5 is the only part of the sheet which is in contact with the solder bath. The latter therefore fixed annular portion 5 of membrane 3 at the same time as the lower face of annular member 4, the mass of which is sufficient for easily absorbing the excess of heat of the bath.

The remainder of the device is then fitted in position, and ball 6 of agate, glass or the like of the usual kind (either complete sphere, or portion of a sphere corresponding to the portion of the sheet which closes the orifice) is applied against the central part of membrane 3, located inside the inner periphery of annular part 4, which is to be torn when the ball is caused to drop.

Fig. 2 shows in its position of service and in section by a plane passing through the axis of the orifice, the arrangement which, in Fig. 3 is shown, on an enlarged scale, upside down.

The elements 7 which support ball 6 are either fusible or deformable at predetermined temperatures. They are supported by arms 8 carried by a collar 9 screwed on threads 10 provided on the outer surface of the body of the bottle or container.

In Fig. 4, the metallic container 1, made in a single piece without welding through any suitable method, carries at any suitable point (advantageously in opposite position with respect to the automatic closing means of Fig. 2) an orifice 11 intended to be fitted with the manually operative means. This orifice 11 is fitted, either by screwing or in any other suitable manner, with a nozzle 12 provided with a central hole, and which is secured in a perfectly fluidtight manner, for instance by welding, in orifice 11. Nozzle 12 is provided, in the part thereof which projects in the inside of bottle or container 1, with a flange 13.

A metallic plug 14 in the form of a cylindrical rod is soldered in the hole of nozzle 12 and against flange 13, so that said plug closes the hole provided in plug 14 in a fluidtight manner.

Opposite this metal plug, the container carries a hand-wheel 15 controlling the movement of a threaded rod 16 the end of which forms a small cone, as at 17, and a push rod 18 adapted to engage into the hole of the nozzle, so that the axial displacement of said rod 18 is controlled by the displacement of threaded part 16 under the action of hand-wheel 15.

A packing device 19 completes the system and it serves both to ensure the fluidtightness of the closing after the metal plug has been removed and to guide and maintain screw 16.

Metal plug 14 may further be provided, at the suitable place, with a shoulder or collar 20 intended to act as an abutment against the shoulder or flange 19 of nozzle 12.

The device just above described works in the following manner:

In order hermetically to close bottle or container 1 before the filling thereof, plug 14 is soldered in the hole of nozzle 12. The provision of flange 13 makes it possible to limit the amount of soldering of plug 14 to the exactly necessary amount. The precision necessary to this operation will be further facilitated if plug 14 is fitted with collar or shoulder 20. Then packing device 19 is fixed in position by securing it to the boss surrounding orifice 11 through any suitable means, and screw threaded rod 16 is screwed by rotating hand-wheel 15 in such manner that push rod 18 is brought to the desired position in the hole of nozzle 12. As a matter of fact, for practical purposes, the hand wheel is turned until the end of the push-rod is at a small distance from the metal plug 14, but without exerting any stress upon said plug.

The bottle is filled with the extinguishing matter. The solder of metal plug 14 is now subjected merely to the pressure of the matter present in said bottle and, theoretically, it is sufficient that the solder shoulder be capable of resisting this pressure for obtaining perfect fluidtightness. However, I can prevent the whole of the pressure from acting on the plug by making use of shoulder 20, and, in this case, the solder will resist still more easily the stress exerted by said pressure.

When it is desired to open the bottle by acting on the manual device, it suffices, through hand wheel 16, to move threaded rod 16 forward, this movement being transmitted to push rod 18. The latter will therefore push plug 14 inside, breaking the solder joint and driving plug 14 into the inside of the bottle. The gas or liquid contained in the bottle will then be allowed to escape to the outside through the hole of nozzle 12 and distribution tube 21.

The movement of threaded rod 16 will be limited by cone 17, which comes to be applied against the edge of packing device 19 and ensures the necessary fluidtightness when, in order to stop the jet of gas or liquid from vessel 1, threaded rod 16 is further screwed until cone 17 is strongly applied against the packing device.

The inner flange 13 of nozzle 12 prevents the plug driven into the inside of the bottle through the action of push rod 18 from coming into a position in which it accidentally stops the outflow of the gas or liquid stored in the body.

It will be readily understood that such a device permits the very quick opening of orifices of large diameter, since the diameter of the push rod is a function of the diameter of plug 14 and consequently the effort necessary for opening the orifice, that is to say the tearing off of the solder joint is in proportion with the size of hand wheel 15 and the pitch of the threads of rod 16.

In fire extinguishers, such an arrangement permits of advantageously replacing the glass bottles that are used at the present time, since these bottles must be broken for the escape of the extinguishing body stored up under pressure therein and since, as there are no possible means of stopping them once opened, they must be replaced after they have been used just once.

Of course, the bottle of a fire extinguisher or, in a general manner, any container intended to receive a matter under pressure, may be fitted with either of the two closing devices above described, or with both of them.

In a general manner, while I have, in the above description, disclosed what I deem to be practical and efficient embodiments of the present invention, it should be well understood that I do not wish to be limited thereto as there might be changes made in the arrangement, disposition, and form of the parts without departing from the principle of the present invention as comprehended within the scope of the appended claim.

What I claim is:

A closing device for an orifice of a vessel adapted to contain a matter under pressure and having an annular seat around said orifice, which comprises, in combination, an annular metal part adapted to fit on said seat, a circular sheet of a soft metal applied upon the outer face of said annular part and folded at the periphery over the outer edge of said annular part, so that it is caught between said annular part and said seat, a layer of solder binding the inner face of said annular part and the folded portion of said sheet with said seat, whereby said sheet thus stops said orifice in a fluidtight manner, said annular part being relatively thick so as to absorb a substantial amount of heat from said solder without deterioration, said sheet being so thin as to break under the effect of the pressure inside said vessel, means adapted to be applied against said sheet, on the outer side of the central part thereof, for forming a rigid support for said part of said sheet, and means for normally holding said above mentioned means in this position, responsive to temperature variations so as to be brought out of action when the temperature exceeds a predetermined value.

JOSEPH MARIE FRANCOIS BOUILLON.